United States Patent
Olinger et al.

[11] Patent Number: 5,971,198
[45] Date of Patent: Oct. 26, 1999

[54] INSULATED VESSELS

[75] Inventors: John L. Olinger, Newark; Jean E. Schelhorn, Granville, both of Ohio

[73] Assignee: Owens Corning Fiberglas Technology, Inc., Summit, Ill.

[21] Appl. No.: 09/052,623

[22] Filed: Mar. 31, 1998

Related U.S. Application Data

[62] Division of application No. 08/608,871, Feb. 29, 1996, Pat. No. 5,797,513.

[51] Int. Cl.[6] .................................................. B65D 5/00
[52] U.S. Cl. .............................. 220/592.27; 220/592.09; 220/592.2
[58] Field of Search ..................... 220/592.09, 592.1, 220/592.2, 592.27, 901

[56] References Cited

U.S. PATENT DOCUMENTS

| | | | |
|---|---|---|---|
| 2,195,077 | 3/1940 | Brown | 220/901 X |
| 2,809,762 | 10/1957 | Cardona | 220/901 X |
| 3,009,601 | 11/1961 | Matsch | 220/423 |
| 3,101,862 | 8/1963 | Matsch | 220/424 X |
| 3,108,706 | 10/1963 | Matsch et al. | 220/424 X |
| 3,199,715 | 8/1965 | Paivanas | 220/424 X |
| 3,238,002 | 3/1966 | O'Connell et al. | 220/421 X |
| 3,298,185 | 1/1967 | Loudon | 220/421 X |
| 3,655,086 | 4/1972 | Trenner | 220/901 X |
| 3,705,498 | 12/1972 | DeHaan | 220/421 X |
| 3,866,785 | 2/1975 | Conte . | |
| 4,154,363 | 5/1979 | Barthel | 220/421 |
| 4,155,482 | 5/1979 | Swaney . | |
| 4,366,917 | 1/1983 | Kotcharian . | |
| 4,394,931 | 7/1983 | Cotgreave et al. | 220/901 X |
| 4,548,335 | 10/1985 | Remes et al. . | |
| 4,808,457 | 2/1989 | Kruck et al. . | |
| 4,835,975 | 6/1989 | Windecker | 220/901 X |
| 4,919,366 | 4/1990 | Cormier | 220/421 X |
| 5,090,981 | 2/1992 | Rusek, Jr. . | |
| 5,094,899 | 3/1992 | Rusek, Jr. . | |
| 5,228,585 | 7/1993 | Lutgen et al. . | |
| 5,273,801 | 12/1993 | Barry et al. . | |
| 5,330,816 | 7/1994 | Rusek, Jr. . | |
| 5,419,139 | 5/1995 | Blum et al. . | |
| 5,508,106 | 4/1996 | Yoshino | 220/420 X |
| 5,797,513 | 8/1998 | Olinger et al. | 220/421 |

*Primary Examiner*—Steven Pollard
*Attorney, Agent, or Firm*—Inger H. Eckert; Stephen W. Barns

[57] ABSTRACT

An insulated vessel (10, 100, 130) is provided which is adapted to receive a low or high temperature material to be insulated from the environment. The vessel comprises inner and outer membranes (20, 110, 140) and (30, 120, 150) and an outer casing (40, 170). The inner membrane defines an inner cavity for receiving the low or high temperature material and has a first portion which defines an entrance into the inner membrane. The outer membrane encases the inner membrane such that a space is defined between the inner and outer membranes. The outer membrane includes a second portion which is positioned adjacent to the first portion. An insulating material (60, 160) is located in the space between the inner and outer membranes. The inner and outer membranes are joined together so as to seal off the space from the environment. The space is evacuated to less than atmospheric pressure. The outer casing surrounds the outer membrane and has sufficient strength to provide structural and abuse integrity to the vessel.

8 Claims, 8 Drawing Sheets

INSULATED VESSELS

CROSS-REFERENCE TO RELATED APPLICATION

The present application is a division of U.S. patent application Ser. No. 08/608,871, filed Feb. 29, 1996 and entlited INSULATED VESSELS, now U.S. Pat. No. 5,797,513.

TECHNICAL FIELD

This invention relates generally to insulated vessels for containment of low or high temperature materials and, more particularly, to insulated vessels formed from thin inner and outer membranes having insulating material therebetween and an outer casing having sufficient strength to provide structal and abuse integrity to the vessel.

BACKGROUND ART

Insulated vessels or containers are known in the prior art for housing low or high temperatare materials. One such container, which is adapted to house cryogenic materials, is disclosed in U.S. Pat. No. 4,548,335 to Remes et al. It comprises an inner metal vessel for housing the cryogenic material and an outer metal vessel which surrounds the inner vessel such that a space is defined between the inner and outer vessels. A superinsulation material is provided in the space between the inner and outer vessels and that space is evacuated to less than atmospheric pressure. The inner and outer vessels are formed having vessel walls of sufficient thickness to permit the space between the vessels to be evacuated without the vessel walls collapsing upon one another. Also, the inner and outer vessel walls are impervious to gases to prevent gases from passing into the space between the two vessels. The outer vessel wall is also of sufficient strength to provide structural and abuse integrity to the container. However, the weight of this container is excessive due to its conrtruction from inner and outer thick-walled structual materials. It should also be noted that it is often times difficult to design and costly to have the manufacturing capability in place to produce a number of thick-walled metal containers of different configurions.

Accordingly, there is a need for an improved insulated vessel which is lightweight and can be easily and inexpensively manufactured in a number of different configurations.

DISCLOSURE OF INVENTION

The insulated vessel of the present invention meets these needs by having inner and outer thin-walled membranes which function as gas barriers, an outer fiber reinforced polymeric casing which provides structural and abuse integrity to the vessel, and a substantially rigid glass insulating pelt which, in addition to performing an insulation function, prevents the inner and outer membranes from collapsing upon one another when the space between the inner and outer membranes is evacuated. In the prior art container noted above, the inner and outer thick-walled vessels performed both the gas barrier and structural and abuse integrity functions. By contrast, the present invention uncouples the gas barrier functions, performed by the inner and outer membranes, from the structural and abuse integrity functions, performed by the outer casing and the glass pelt.

In accordance with one aspect of the present invention, an insulated vessel is provided which is adapted to receive a low or high temperature material to be insulated from the environment. The vessel comprises inner and outer membranes and an outer casing. The inner membrane defines an inner cavity for receiving the low or high temperature material and has a first portion which defines an entrance into the inner membrane. The outer membrane encases the inner membrane such that a space is defined between the inner and outer membranes. The outer membrane includes a second portion which is positioned adjacent to the first portion. An insulating material or media is located in the space between the inner and outer membranes. The inner and outer membranes are joined together so as to seal off the space from the environment. The space is evacuated to less than atmospheric pressure. The outer casing surrounds the outer membrane and has sufficient strength to provide structural and abuse integrity to the vessel.

Preferably, the inner and outer membranes are joined together only at the first and second portions. By limiting the amount of contact between the inner and outer membranes, which are highly thermally conductive compared to the insulation between them, the amount of energy transferred between the inner and outer membranes is minimized.

In accordance with a first embodiment of the present invention, the inner and outer membranes have respectively third and fourth portions, each having a generally spherical shape. Alternatively, the third and fourth portions may have a generally cylindrical shape. It is also contemplated that the inner and outer membranes may have a rectangular shape or other geometric shape.

The insulating material preferably comprises a substantially rigid glass fiber pelt. The insulating material may also comprise a combination of foil and glass insulating material or other similar insulating material, such as compacted porous powders, highly porous solids such as rigid open cell organic foams or very porous cast ceramics.

Preferably, the inner and outer membranes are formed from a thin material, such as one having a thickness of between 5 and 15 mils. The material from which the membranes are formed is preferably a low thermal conductance material such as a stainless steel, or a high nickel alloy such as Invar, which alloy typically has a low thermal expansion coefficient.

The outer casing is preferably formed from a glass fiber reinforced plastic.

In accordance with a second aspect of the present invention, a method is provided for forming an insulated vessel adapted to receive a low or high temperature material to be insulated from the environment. The method comprises the steps of: providing an inner membrane having an inner cavity for receiving the low or high temperature material; providing insulating material adjacent to the inner membrane; providing an outer membrane adjacent to the inner membrane such that a space is defined between the inner and outer membranes; evacuating the space between the inner and outer membranes to a pressure less than atmospheric pressure; joining the inner and outer membranes so as to seal off the space from the environment; and forming an outer casing about the outer membrane which is sufficiently strong to provide structural and abuse integrity to the vessel.

The insulating material is located in the space between the inner and outer membranes.

The step of providing an inner membrane having an inner cavity for receiving the low or high temperature material comprises the step of providing an inner membrane having two intermediate cylindrical portions, a lower cap portion and an upper cap portion. The upper and lower cap portions are weldably joined to the intermediate cylindrical portions. Alternatively, the step of providing an inner membrane having an inner cavity for receiving the low or high temperature material comprises the step of providing an inner membrane having a generally rectangular shape.

In accordance with a third aspect of the present invention, a method is provided for forming an insulated vessel adapted to receive a low or high temperature material to be insulated from the environment. The method comprises the steps of: providing first, second, third and fourth membrane sections; joining the first and second membrane sections to form an inner membrane having an inner cavity for receiving the low or high temperature material; providing insulating material adjacent to the inner membrane; joining the third and fourth membrane sections to form an outer membrane which encases the inner membrane such that a space is defined between the inner and outer membranes; evacuating the space to a pressure less than atmospheric pressure; joining the inner and outer membranes so as to seal off the space from the environment; and forming an outer casing about the outer membrane which provides structural and abuse integrity to the vessel.

Each of the first, second, third and fourth membrane sections may be shaped like an hourglass having a lengthened midsection. Further, the first and second membrane sections are weldably joined together and the third and fourth membrane sections are weldably joined together.

The method may further comprise the steps of: joining a first generally cylindrical portion to the first and second sections; joining a second generally cylindrical portion to the third and fourth sections; and wherein the step of joining the inner and outer membranes comprises the step of joining the first and second portions together. The first portion defines an entrance into the inner membrane. The second portion is positioned adjacent to the first portion.

Accordingly, it is an object of the present invention to provide an insulated vessel for housing a low or high temperature material. It is further an object of the present invention to provide a light weight insulated vessel having an outer casing formed from a fiber reinforced plastic. It is another object of the present invention to provide an insulated vessel having inner and outer thin-walled membranes and a rigid glass insulating pelt interposed therebetween. These and other objects of the present invention will be apparent from the following description, the accompanying drawings and the appended claims.

MODES FOR CARRYING OUT THE INVENTION

Figure 1:
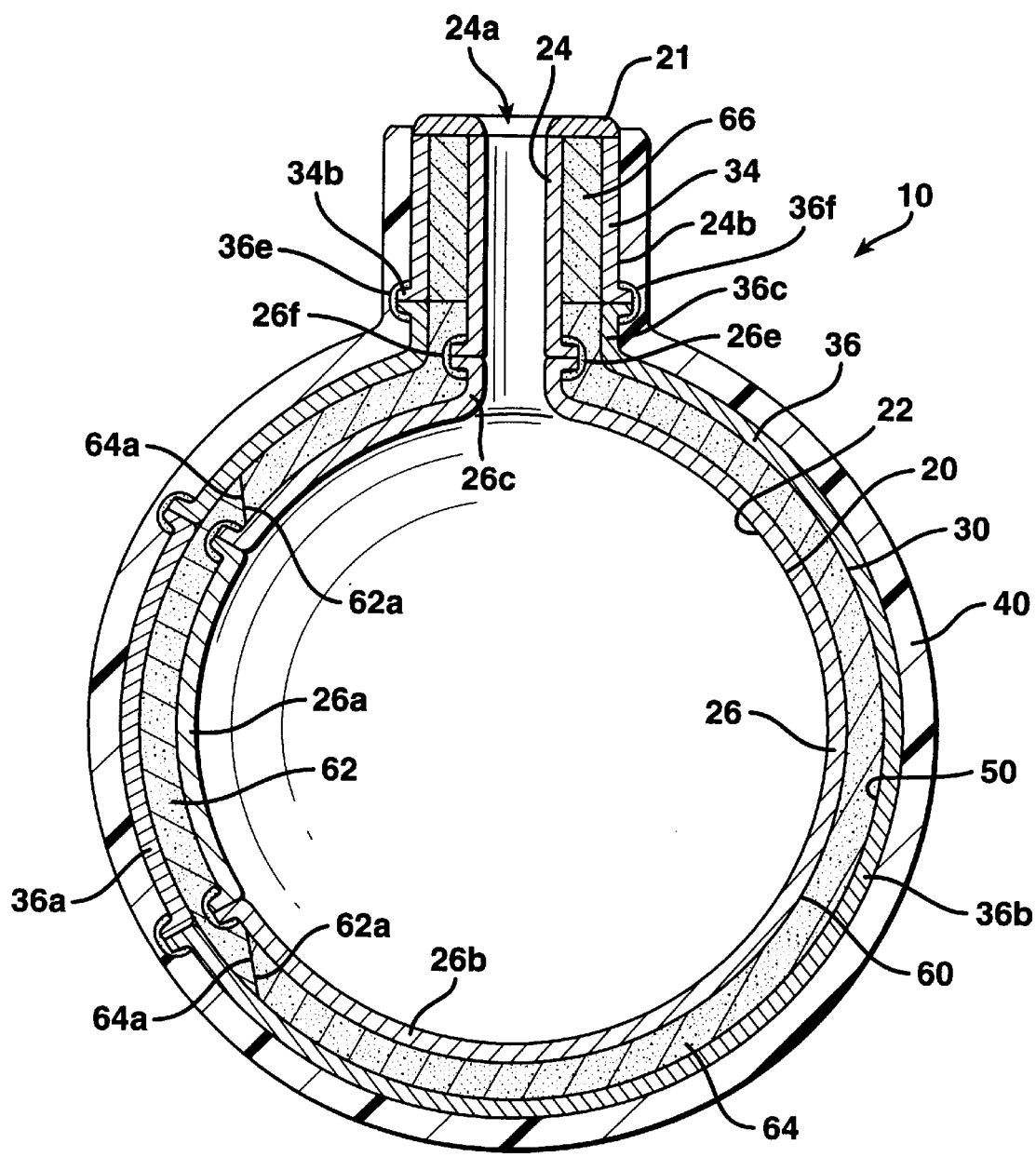
FIG. 1 is a cross sectional view of an insulated containment vessel constructed in accordance with a first embodiment of the present invention.

An insulated containment vessel 10 constructed in accordance with a first embodiment of the present invention is shown in FIG. 1. The vessel 10 is adapted to receive a low or high temperature material. Materials which may be housed in the vessel include a low boiling liquefied gas, such as helium, nitrogen, argon, hydrogen, oxygen, natural gas, ammonia, carbon dioxide and the like. Such liquids may be housed in the vessel 10 under a pressure ranging from about 10 to 100 psi (69 to 690 kPa). It is also contemplated that high temperature materials, such as molten asphalt or other chemicals to be held in a molten state, may be housed in the vessel 10.

Figure 2B:
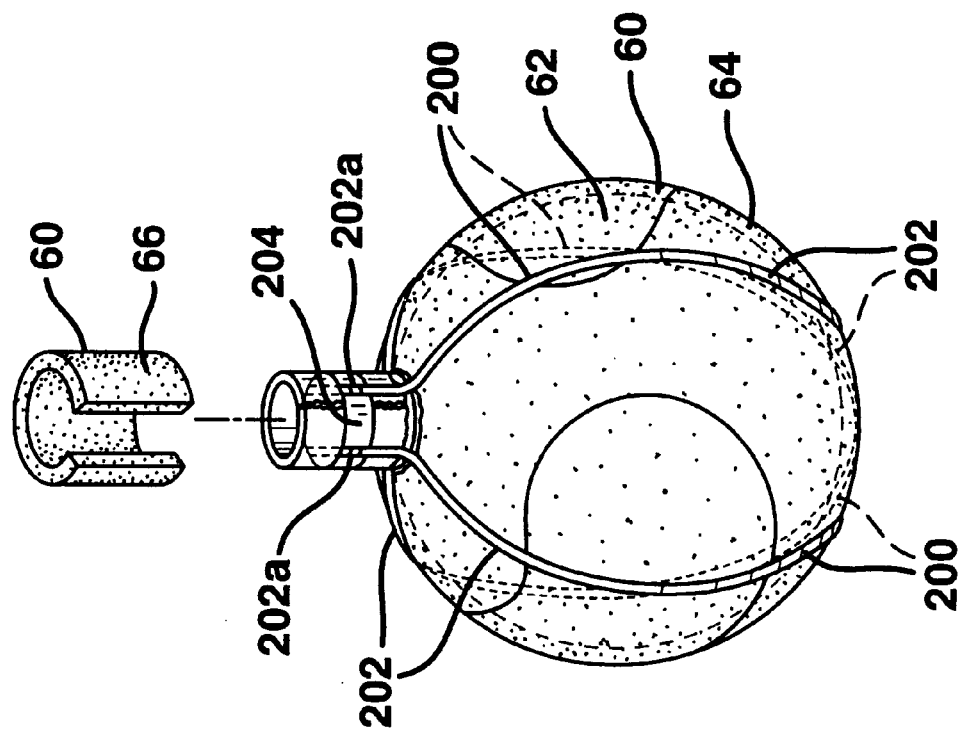
FIGS. 2A–2D are perspective views illustrating the process for forming the vessel shown in FIG. 1.
Figure 2A:
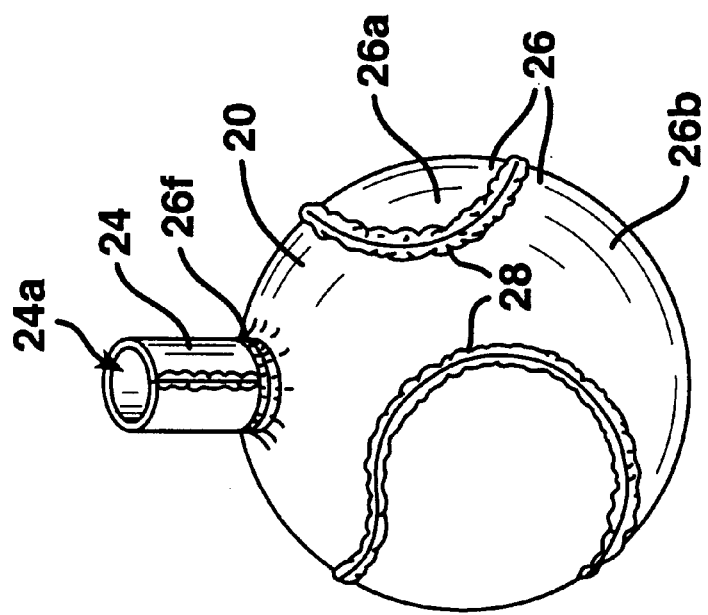
Figure 2D:
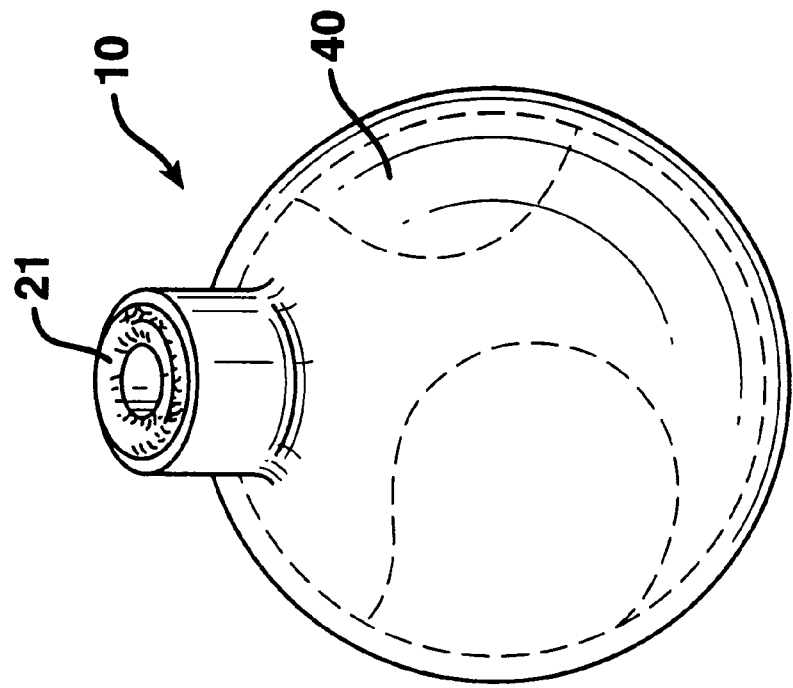
Figure 2C:
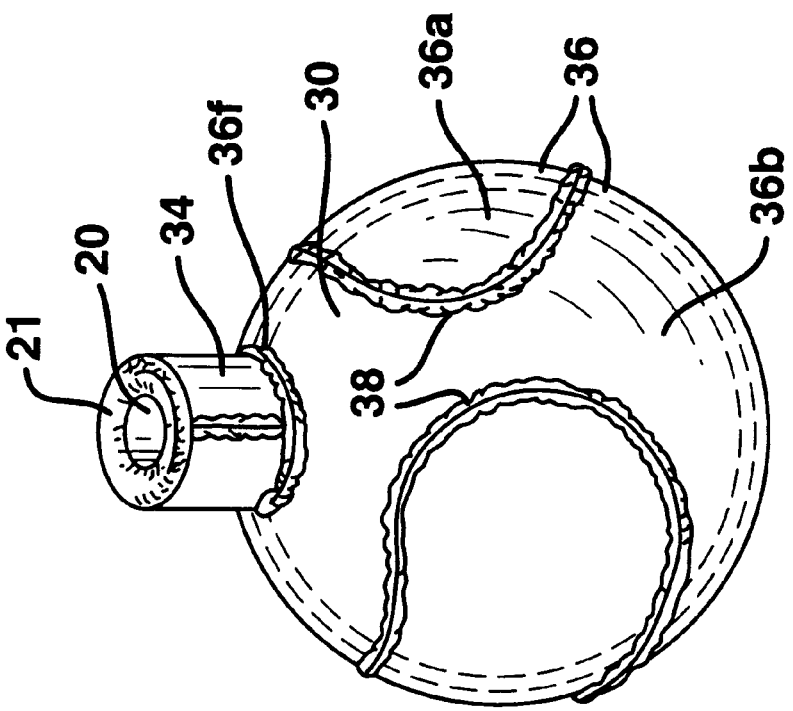

The insulated vessel 10 comprises inner and outer membranes 20 and 30 (also referred to herein as first and second membranes) and an outer casing 40. The inner membrane 20 defines an inner cavity 22 for receiving the low or high temperature material. The inner membrane includes a generally cylindrical first portion 24 which defines an entrance 24a into the inner membrane 20, see also FIG. 2A. The outer membrane 30 includes a generally cylindrical second portion 34 which is spaced from the first portion 24, see FIG. 2C. The inner and outer membranes 20 and 30 also have respectively third and fourth portions 26 and 36, each having a generally spherical shape, see FIGS. 2A and 2C. The outer membrane 30 encases the inner membrane 20 such that a space 50 is defined between the inner and outer membranes 20 and 30. An insulating material 60 is located in the space 50 between the inner and outer membranes 20 and 30. The inner and outer membranes 20 and 30 are joined together via a weld 21 so as to seal off the space 50 from the environment. The space 50 is evacuated to a pressure falling within a range of about $10^{-5}$ to 1.0 Torr, and preferably to a pressure of about $10^{-2}$ Torr.

Figure 3:
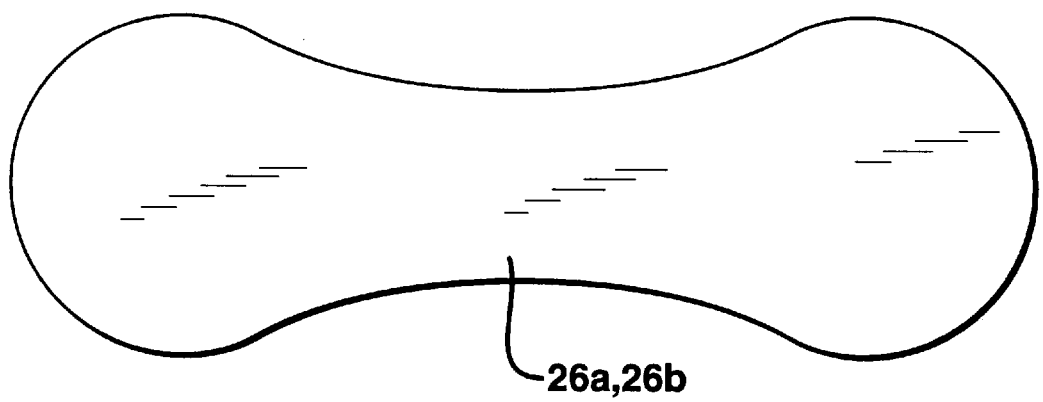
FIG. 3 is a plan view of one of the first and second sections used to form the third portion of the inner membrane.
Figure 4:
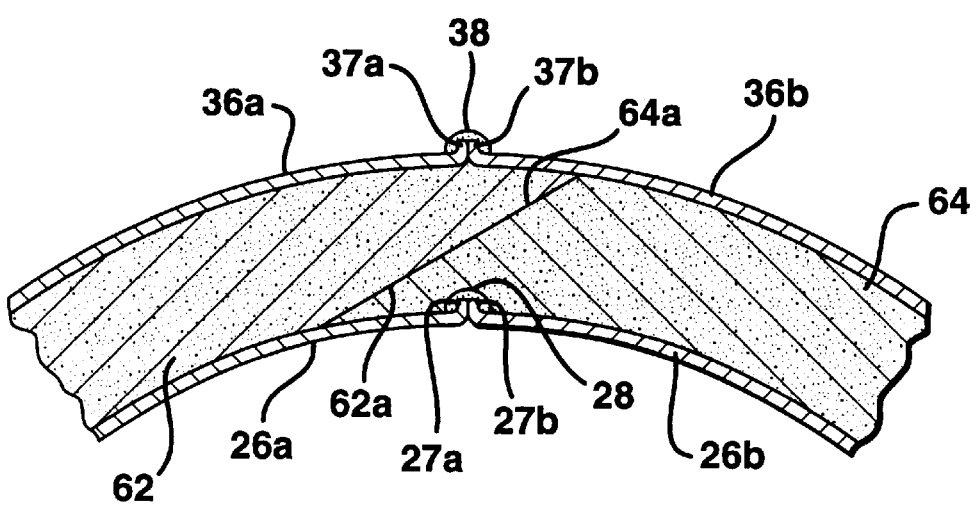
FIG. 4 is a cross sectional view of a portion of the inner and outer membranes and insulating material of the insulated vessel illustrated in FIG. 1.

The third portion 26 of the inner membrane 20 is formed from first and second membrane sections 26a and 26b, which are of generally the same shape and size. As can be discerned from FIG. 3, the first and second membrane sections 26a and 26b are shaped like an hourglass having a lengthened midsection. The outer edges 27a and 27b of the first and second sections 26a and 26b are flanged, i.e., the outer edges are turned at an angle of approximately 90°, see FIG. 4. The third portion 26 is formed by reshaping the generally flat first and second sections 26a and 26b so that they have a generally round configuration and positioning the two sections 26a and 26b adjacent to one another such that the outer edges 27a and 27b abut one another. The edges 27a and 27b are then welded or otherwise joined together such that a seam 28 is formed which extends along the third portion 26 and is similar in shape to a seam on a baseball, see FIG. 2A.

The second section 26b is provided with a neck portion 26c which defines an opening into the third portion 26, see FIG. 1. The neck portion 26c has a flanged edge 26e. The first portion 24 has a flanged lower edge 24b which is positioned adjacent to the flanged edge 26e of the neck portion 26c and the edges 24b and 26e are welded or otherwise secured to one another such that a seam 26f is formed. The first portion 24 may be joined to the second section 26b either before or after the first and second sections 26a and 26b are welded together.

In the illustrated embodiment, the insulating material 60 comprises a glass pelt which is constructed from first, second and third glass pelt sections 62, 64 and 66. The first and second pelt sections 62 and 64 are each shaped like an hourglass having a lengthened midsection. The outer edges 62a and 64a of the first and second pelt sections 62 and 64 are sloped so as to extend at an angle, e.g., 45°, to the inner and outer surfaces of the first and second sections 62 and 64, see FIG. 4. The third pelt section 66 is formed so as to have a generally cylindrical shape.

Preferably, the pelt sections 62, 64 and 66 are formed from glass fibers, without a binder, which glass fibers are subjected to a heat setting process, such as disclosed in U.S. Pat. No. 5,330,816, the disclosure of which is incorporated herein by reference. As such, the glass fibers comprising each of the pelt sections 62, 64 and 66 are joined to one another to form a generally rigid pelt section.

It is contemplated that glass fibers may be heated and compressed in appropriately shaped molds so as to form pelt sections 62, 64 and 66 having desired final shapes. Thus, little or no additional shaping is required after molding before the sections 62, 64 and 66 are positioned adjacent to the inner membrane 20. It is also contemplated that glass fibers may be heated and compressed between generally flat platens, such as disclosed in U.S. Pat. No. 5,330,816, at a temperature falling within the range of 300° C. to 500° C. and compressed at a pressure falling within the range of 10 psi to 50 psi (69 kPa to 345 kPa) so as to form generally flat pelt sections. The generally flat pelt sections 62 and 64 are shaped like an hourglass having a lengthened midsection and the generally flat pelt section 66 is rectangular or square in shape. It is believed that the glass fiber pelt sections formed in this manner will be sufficiently pliable so as to be manually formable about the inner membrane 20.

In the illustrated embodiment, the first and second pelt sections 62 and 64 are positioned about the inner membrane 20 such that the edge portions 62a and 64b of the first and second pelt sections 62 and 64 abut against one another. A removable strapping apparatus 200 is then positioned about the first and second pelt sections 62 and 64 to hold those sections in place against the inner membrane 20 so that the fourth portion 36 of the outer membrane 30 may be formed about the pelt sections 62 and 64. The strapping apparatus 200 comprises a plurality of straps 202 formed from metal, leather or a polymeric material. The straps 202 are fixedly secured at first ends 202a to a metal or polymeric ring 204 and are capable of being releasably secured at their second ends to the ring 204 via set screws, loop and pile fastening material (Velcro™), snaps or other similar releasably fastening means (not shown). The second ends of the straps 202 are fastened to the ring 204 to secure the pelt sections 62 and 64 against the inner membrane 20.

Once the pelt sections 62 and 64 have been secured in position about the inner membrane 20, the fourth portion 36 of outer membrane 30 is formed about the pelt sections 62 and 64. The fourth portion 36 comprises third and fourth membrane sections 36a and 36b, which are shaped like an hourglass having a lengthened midsection. The outer edges 37a and 37b of the third and fourth sections 36a and 36b are flanged, i.e., the outer edges 37a and 37b are turned at an angle of approximately 90°, see FIG. 4. The fourth portion 36 is formed by reshaping the generally flat third and fourth sections 36a and 36b so that they have a generally round configuration and positioning the rounded sections 36a and 36b about the first and second sections 62 and 64 such that their outer edges 37a and 37b abut against one another. Thereafter, the edges 37a and 37b are welded to one another or otherwise joined together such that a seam 38 is formed which is shaped like a seam on a baseball, see FIG. 2C. The strapping apparatus 200 is then removed by releasing the second ends of the straps 202 from the ring 204 and pulling the straps 202 out from between the pelt sections 62 and 64 and the outer membrane 30.

Next, the third pelt section 66 is positioned about the first portion 24 of the inner membrane 20 and the second portion 34 is then positioned about the pelt section 66. The fourth section 36b is provided with a neck portion 36c which defines an opening into the fourth portion 36. The neck portion 36c has a flanged edge 36e. The second portion 34 has a flanged lower edge 34b which is positioned adjacent to the flanged edge 36e of the neck portion 36c and the edges 34b and 36e are welded or otherwise secured to one another such that a seam 36f is formed.

The inner and outer membranes 20 and 30 are weldably joined to one another at the upper sections of the first and second portions 24 and 34. By limiting the amount of contact between the inner and outer membranes 20 and 30, the amount of heat energy transferred between the inner and outer membranes 20 and 30 is minimized.

Preferably, the inner and outer membranes 20 and 30 are formed from a thin material, such as one having a thickness of between 5 and 15 mils. The material from which the membranes are formed is preferably a low thermal conductance material such as a stainless steel or a nickel alloy, such as Invar, which alloy typically has a very low thermal expansion coefficient. It is also contemplated that the inner and outer membranes may be formed from metlized polymer films with the metal coating on the inner membrane facing inwardly and the metal coating on the outer membrane facing outwardly. It is also preferred that the edges of the polymer films be metal free so as to allow adjacent membrane sections to be weldably joined to one another.

The outer casing 40 preferably comprises a composite material made from glass, graphite, aramid, Kevlar or like reinforcement fibers embedded in an epoxy or other polymeric matrix material. The outer casing 40 may be formed via a filament winding process, wherein polymer-coated reinforcement fibers are wound about the outer membrane 30. It is also contemplated that the outer casing 40 may be formed via a resin transfer molding process. This involves forming a reinforcement preform from fibers or mat pieces made from reinforcement fibers and a binder, placing the preform between the outer membrane 30 and a mold, placing an inflatable object inside the inner membrane 20 and inflating same, and injecting a resin material between the mold and outer membrane 30 such that the resin material impregnates the reinforcement fibers and/or reinforcement mat pieces of the preform. The entire structure including the mold is then placed in an oven to effect curing of the resin. It is further contemplated that the outer casing 40 may be formed in sections via an injection or other molding process, which sections are subsequently joined together about the outer membrane 30 to form the casing 40.

Figure 5:
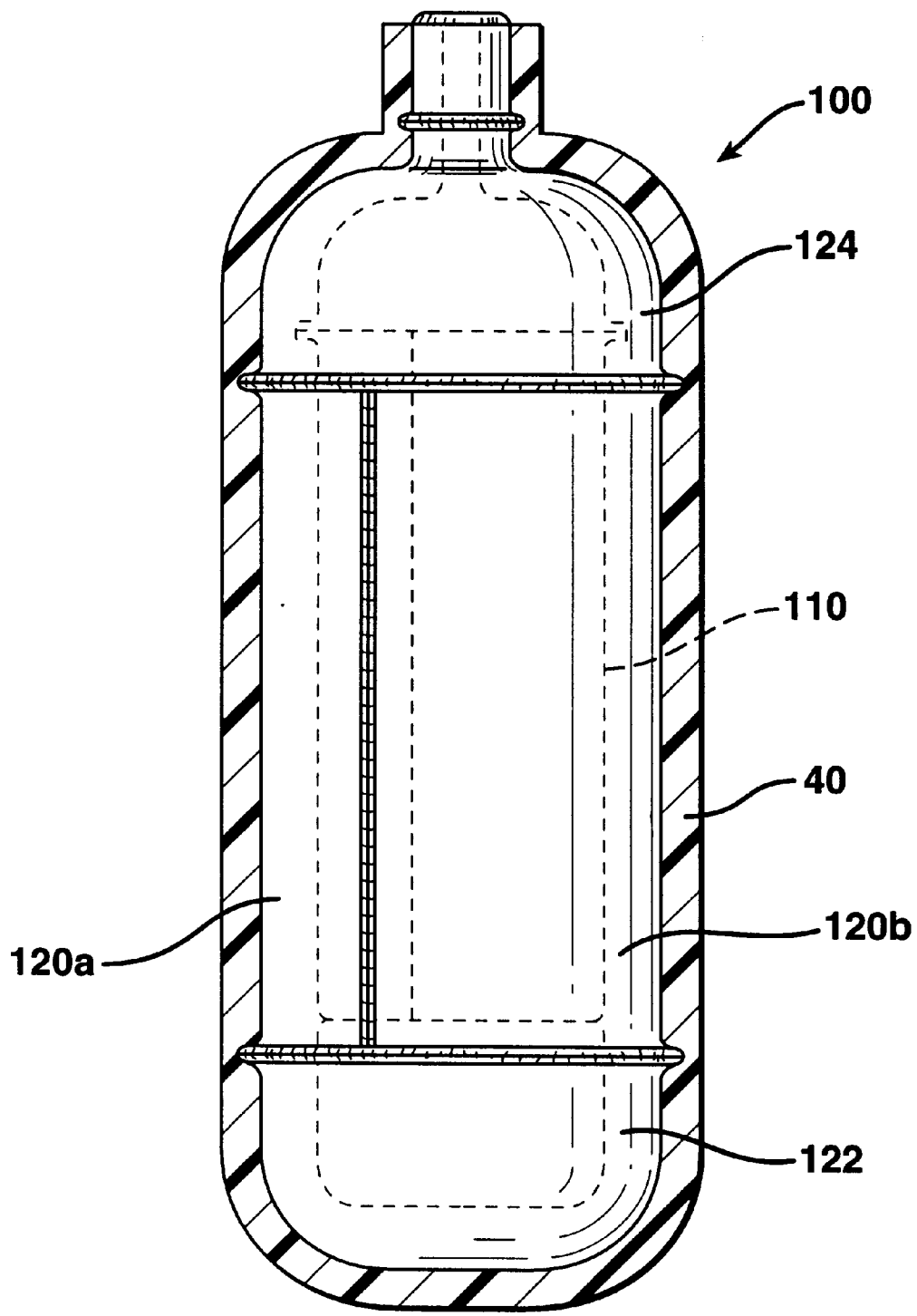
FIG. 5 is a side view, partially in cross section, of a insulated containment vessel formed in accordance with a second embodiment of the present invention.
Figure 6:
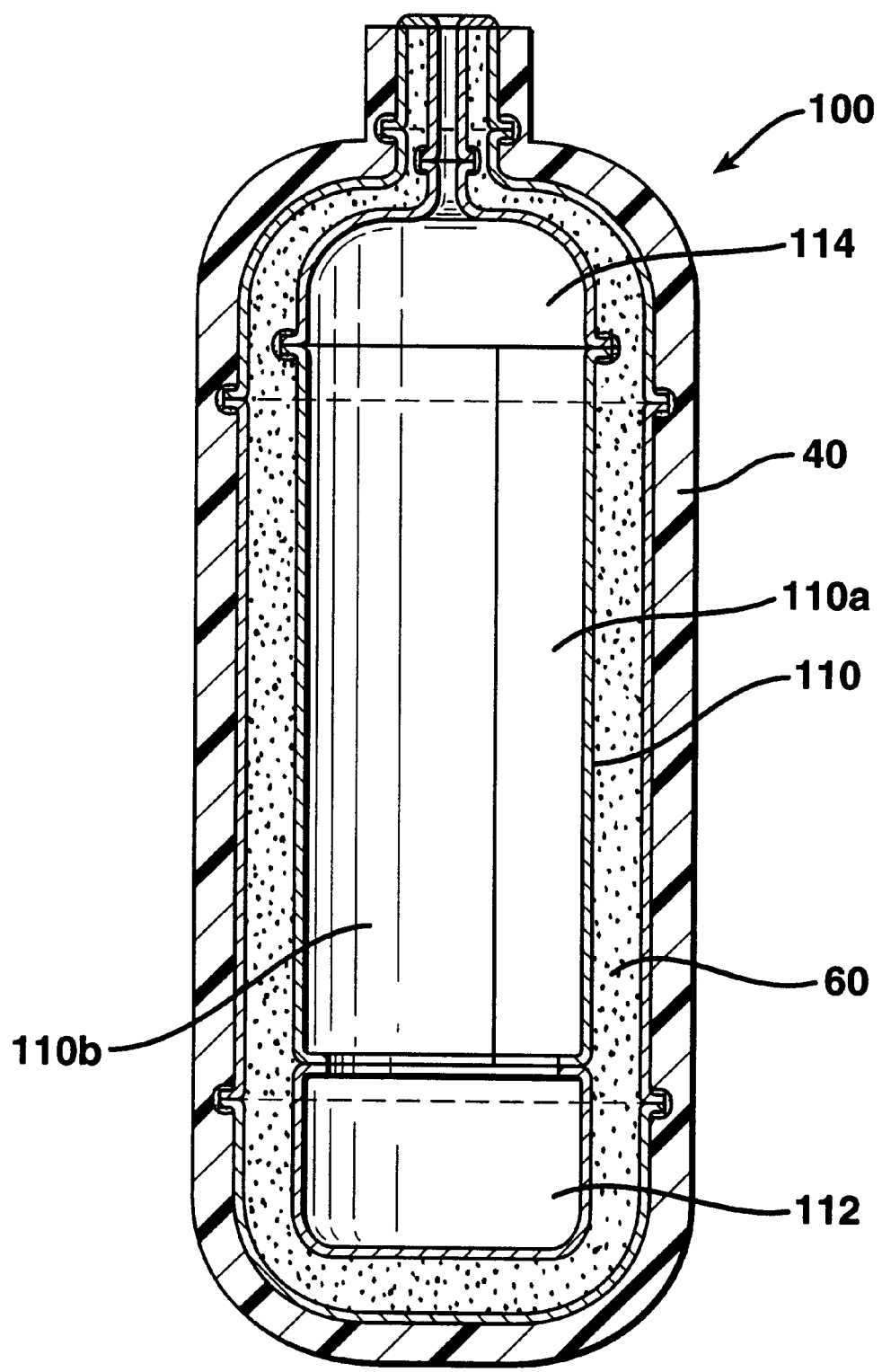
FIG. 6 is a side, cross sectional view of the vessel illustrated in FIG. 5.

An insulated containment vessel 100, constructed in accordance with a second embodiment of the present invention, will now be described with reference to FIGS. 5 and 6, where like elements are referenced by like numerals. In this embodiment, the inner membrane 110 is formed having two intermediate cylindrical portions 110a and 110b, which are weldably secured to one another, a lower cap portion 112 and an upper cap portion 114. The lower and upper cap portions 112 and 114 are weldably joined to the intermediate cylindrical portions 110a and 110b. The outer membrane 120 is formed having two intermediate cylindrical portions 120a and 120b, which are weldably secured to one another, a lower cap portion 122 and an upper cap portion 124. The lower and upper cap portions 122 and 124 are weldably joined to the intermediate cylindrical portions 120a and 120b. Interposed between the inner and outer membranes 110 and 120 is insulating material 60. Formed about the outer membrane is a fiber reinforced plastic outer casing 40.

Figure 7:
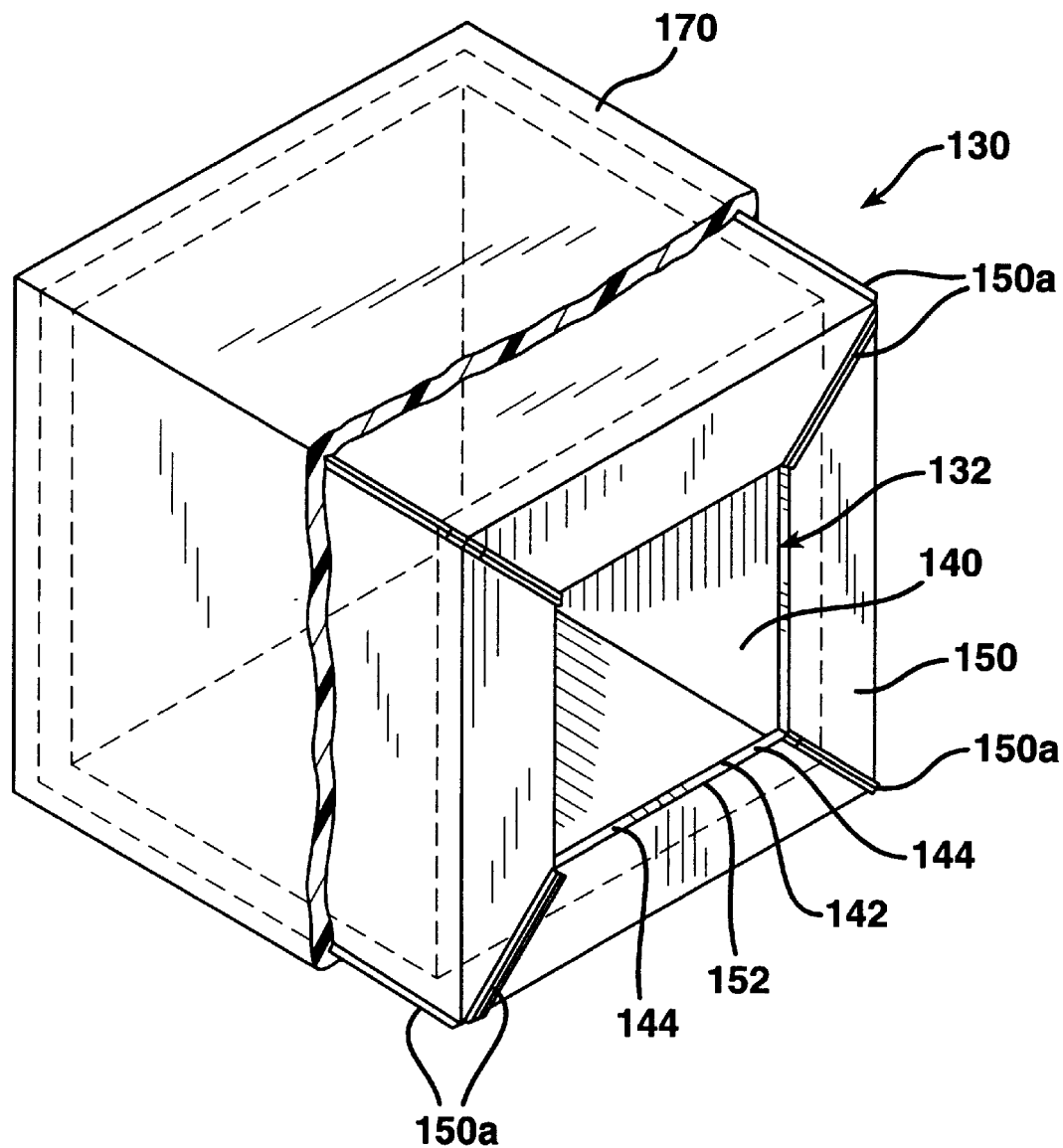
FIG. 7 is a perspective view of an insulated containment vessel with its outer casing partially removed formed in accordance with a third embodiment of the present invention.
Figure 8:
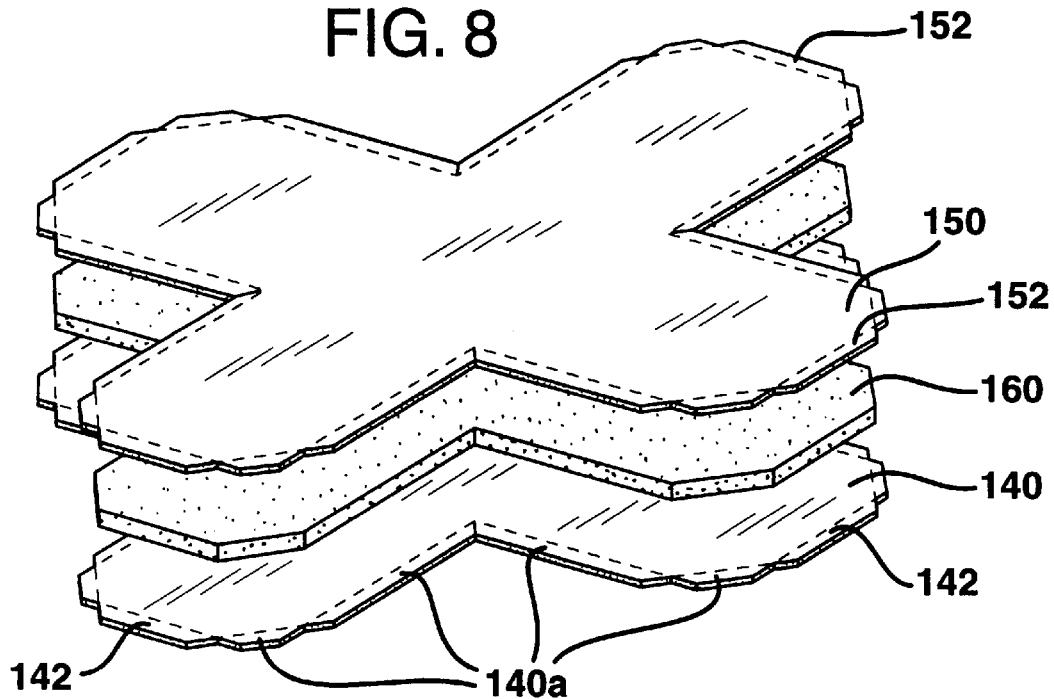
FIG. 8 is a perspective view of the inner and outer membranes and the insulating material prior to being formed into the vessel illustrated in FIG. 7.
Figure 9:
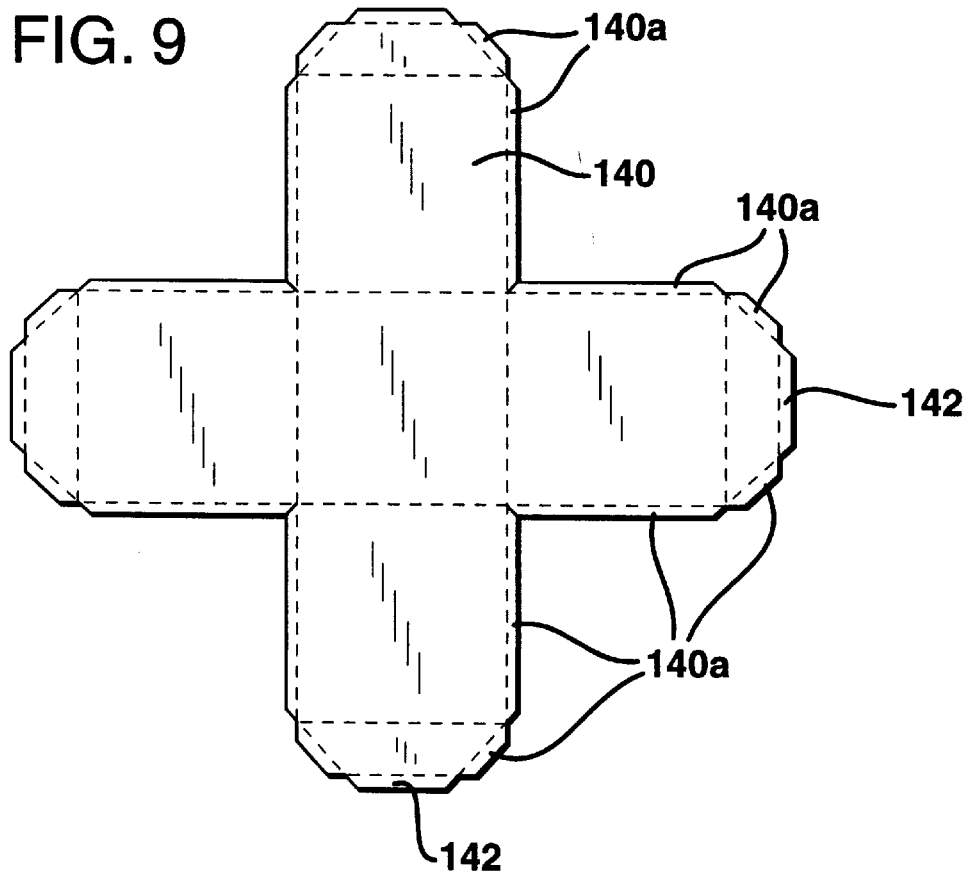
FIG. 9 is a plan view of the inner membrane prior to being formed as part of the vessel illustrated in FIG. 7.

An insulated containment vessel 130, constructed in accordance with a third embodiment of the present invention, will now be described with reference to FIGS. 7–9. In this embodiment, the inner membrane 140 is formed in the shape of a rectangle or square. The insulating material 160 is formed about the inner membrane 140 and it also has a square or rectangular shape. The outer membrane 150 is formed about the insulating material 160. Before the inner and outer membranes 140 and 150 and the insulating material 160 are formed as shown in FIG. 7, they may appear as flat structures as shown in FIGS. 8 and 9.

The edge portions 140a of the first membrane 140 are welded together so as to form a rectangular structure. Similarly, the edge portions 150a of the second membranes 150 are welded together so as to form a rectangular structure. Formed about the outer membrane 150 is a fiber reinforced plastic outer casing 170.

The inner and outer membranes 140 and 150 are joined at edge portions 142 and 152 via a weld 144. The weld 144 defines an opening 132 into the vessel 130. In the illustrated embodiment, the size of the opening 132 is minimized e.g., it is less than the size of one side of the vessel 130, so as to limit the amount of surface contact between the inner and outer membranes 140 and 150 and, hence, the amount of energy transferred between the inner and outer membranes 140 and 150. A door (not shown) may be provided for closing off the vessel 130. The door may be hinged or otherwise connected to the vessel 130. The door may include a vacuum insulation panel, such as disclosed in U.S. Pat. Nos. 5,090,981 and 5,094,899, the disclosures of which are hereby incorporated by reference. It is also contemplated that the opening 132 may be defined by a cylindrical portion which would be similar to the cylindrical portions shown in FIGS. 1–6.

It is also contemplated that the insulating material 60 may comprise compacted porous powders, e.g., precipitated silica, in a bag; fine open cell organic foams such as urethane foams which are commercially available from ICI Foams under the product name VacPac; or porous cast/formed rigid ceramics such as those commercially available from Aerojet under the product name Aerogel.

Having described the invention in detail and by reference to the preferred embodiments thereof, it will be apparent that other modifications and variations are possible without departing from the scope of the invention defined in the appended claims.

We claim:

1. A method for forming an insulated vessel adapted to receive a low or high temperature material to be insulated from the environment, said method comprising the steps of:
    providing an inner membrane (20, 110, 140) having an inner cavity for receiving the low or high temperature material;
    providing insulating material (60, 160) adjacent to said inner membrane;
    providing an outer membrane (30, 120, 150) spaced from said inner membrane such that a space is defined between said inner and outer membranes, said insulating material being located in said space;
    evacuating said space to a pressure less than atmospheric pressure;
    joining said inner and outer membranes to seal off said space from the environment; and
    forming an outer casing (40, 170) about said outer membrane which provides structural and abuse integrity to said vessel.

2. A method as set forth in claim 1, wherein said step of providing an inner membrane having an inner cavity for receiving the low or high temperature material comprises the step of providing an inner membrane having two intermediate cylindrical portions (110a, 110b), a lower cap portion (112) and an upper cap portion (114), said upper and lower cap portions being weldably joined to said intermediate cylindrical portions.

3. A method as set forth in claim 1, wherein said step of providing an inner membrane having an inner cavity for receiving the low or high temperature material comprises the step of providing an inner membrane (140) having a generally rectangular shape.

4. A method for forming an insulated vessel adapted to receive a low or high temperature material to be insulated from the environment, said method comprising the steps of:
    providing first, second, third and fourth membrane sections (26a, 26b, 36a, 36b);
    joining said first and second membrane sections to form an inner membrane (20) having an inner cavity for receiving the low or high temperature material;
    providing insulating material (60) adjacent to said inner membrane;
    joining said third and fourth membrane sections to form an outer membrane (30) which encases said inner membrane such that a space is defined between said inner and outer membranes, said insulating material being located in said space;
    evacuating said space to a pressure less than atmospheric pressure;
    joining said inner and outer membranes so as to seal off said space from the environment; and
    forming an outer casing (40) about said outer membrane which provides structural and abuse integrity to said vessel.

5. A method as set forth in claim 4, wherein each of said first, second, third and fourth membrane sections is shaped like an hourglass having a lengthened midsection.

6. A method as set forth in claim 4, wherein said first and second membrane sections are weldably joined together and said third and fourth membrane sections are weldably joined together.

7. A method as set forth in claim 4, further comprising the steps of:
    joining a first generally cylindrical portion (24) to said first and second sections, said first portion defining an entrance into said inner membrane;
    joining a second generally cylindrical portion (34) to said third and fourth sections, said second portion being positioned adjacent to said first portion; and
    wherein said step of joining said inner and outer membranes comprises the step of joining said first and second portions together.

8. A method as set forth in claim 4, wherein each of said first, second, third and fourth sections has a thickness of between approximately 5 to 15 mils.

* * * * *